(12) United States Patent
Watanabe et al.

(10) Patent No.: US 7,670,664 B2
(45) Date of Patent: Mar. 2, 2010

(54) HONEYCOMB STRUCTURE BODY

(75) Inventors: Atsushi Watanabe, Nagoya (JP);
Naoshi Masukawa, Kitanagoya (JP);
Shuichi Ichikawa, Handa (JP)

(73) Assignee: NGK Insulators, Ltd., Nagoya (JP)

( * ) Notice: Subject to any disclaimer, the term of this patent is extended or adjusted under 35 U.S.C. 154(b) by 0 days.

(21) Appl. No.: 12/239,260

(22) Filed: Sep. 26, 2008

(65) Prior Publication Data

US 2009/0022944 A1    Jan. 22, 2009

Related U.S. Application Data

(63) Continuation of application No. PCT/JP2007/052787, filed on Feb. 15, 2007.

(30) Foreign Application Priority Data

Mar. 30, 2006    (JP) ............... 2006-094267

(51) Int. Cl.
*B32B 3/12*    (2006.01)
(52) U.S. Cl. ..................................... 428/116
(58) Field of Classification Search ............. 428/116, 428/117, 118, 119; 55/523, 483, 385.3
See application file for complete search history.

(56) References Cited

U.S. PATENT DOCUMENTS

| 6,669,751 | B1 | 12/2003 | Ohno et al. |
| 2004/0055265 | A1 | 3/2004 | Ohno et al. |
| 2006/0021310 | A1 | 2/2006 | Ohno et al. |
| 2007/0082174 | A1 | 4/2007 | Masukawa et al. |

FOREIGN PATENT DOCUMENTS

| JP | A-2000-7455 | 1/2000 |
| JP | A-2001-162119 | 6/2001 |
| JP | A-2002-273137 | 9/2002 |
| WO | WO 2005/089901 A1 | 9/2005 |

*Primary Examiner*—Timothy M Speer
*Assistant Examiner*—Gordon R Baldwin
(74) *Attorney, Agent, or Firm*—Oliff & Berridge, PLC

(57) ABSTRACT

In a honeycomb structure 1 which is made of a ceramic and in which a plurality of honeycomb segments 12 having cell structures 5 and porous outer walls 7 on outer peripheries of the cell structures 5 are integrated by bonding these outer walls 7 to one another with a bonding material 8, each of the cell structures being provided with a plurality of cells 3 constituting fluid channels divided by porous partition walls 2, a base material constituting the honeycomb structure 1 has a thermal conductivity of 0.1 to 20 W/mK. Moreover, an outer periphery coating material constituting the outer peripheral wall of the honeycomb structure 1 has a porosity of 10 to 60%. Furthermore, the outer periphery coating material constituting the outer peripheral wall of the honeycomb structure 1 has a thermal conductivity of 0.01 to 0.5 W/mK.

7 Claims, 2 Drawing Sheets

HONEYCOMB STRUCTURE BODY

TECHNICAL FIELD

The present invention relates to a honeycomb structure. More particularly, the present invention relates to a honeycomb structure preferably usable in a catalyst carrier for an internal combustion engine, a boiler, a chemical reaction device, a reformer for a fuel cell and the like in which a catalyst function is used, a trap filter of fine particles in an exhaust gas, and the like, and it relates to a honeycomb structure which has, for example, a large size but in which a plurality of honeycomb segments are securely bonded to one another. More particularly, the present invention relates to a honeycomb structure which is made of a ceramic and in which a plurality of honeycomb segments having cell structures and porous outer walls on outer peripheries of the cell structures are integrated by bonding these outer walls to one another with a bonding material, each of the cell structures being provided with a plurality of cells constituting fluid channels divided by porous partition walls.

BACKGROUND ART

A honeycomb structure made of a ceramic has been used in a catalyst carrier for an internal combustion engine, a boiler, a chemical reaction device, a reformer for a fuel cell and the like in which a catalyst function is used, a trap filter such as diesel particulate filter (hereinafter referred to as "(DPF)") of fine particles in an exhaust gas, particularly diesel fine particles and the like.

The DPF as one type of filter is incorporated in the exhaust system of a diesel engine to trap and remove particulates included in the exhaust gas from the diesel engine or the like. Examples of a material forming the trap filter typified by this DPF include a ceramic, a metal and an alloy. As a typical example of the filter made of the ceramic, a honeycomb filter made of cordierite, silicon carbide, silicon nitride or aluminum titanate is known. In particular, a honeycomb structure filter including porous honeycomb segments formed of a sintered body of silicon carbide or silicon nitride has an advantage that thermal resistance, strength and thermal conductivity are high, whereas there has been a problem that the filter has low thermal shock. In consequence, as the filter is large, crack is easily generated in the filter. Therefore, in recent years, as means for avoiding damage due to the crack, a technology has been suggested in which a plurality of porous honeycomb segments are integrated to manufacture one large ceramic structure (e.g., Patent Document 1).

This honeycomb structure has a constitution in which a plurality of porous honeycomb segments made of silicon carbide or the like are bonded to one another with a bonding material, processed into a predetermined shape such as a circular sectional shape, and then coated with a coating material. Each of the honeycomb segments has a large number of through holes which are separated by porous partition walls and which extend through the structure in an axial direction. The ends of the adjacent through holes are alternately plugged. The end of one through hole on the one side is opened, whereas the end thereof on the other side is plugged. The end of the other through hole adjacent to the one through hole on the other side is plugged, but the end of the other through hole on the one side is opened. According to such a constitution, when the exhaust gas flows into the through hole from the opened end, the exhaust gas passes through the porous partition wall and is discharged from the other through hole. When the gas passes through the partition wall, particulates in the exhaust gas are trapped by the partition wall, so that the exhaust gas can be purified.

In this honeycomb structure, deposited soot is burnt and gasified, whereby the filter is regenerated, and the particulates in the exhaust gas can be trapped again.

However, when the ceramic structure is used as the filter, there has been a problem that the fine particles trapped in the filter are not completely burnt, and easily partially remain unburnt. Therefore, the conventional honeycomb structure has a poor efficiency in treating the exhaust gas.

It is considered that a cause for the occurrence of such a problem lies in that thermal conduction between the filters is disturbed to make a temperature difference in the ceramic structure, and a ceramic filter assembly is suggested in which the thermal conduction between the filters is not easily disturbed to provide equally an excellent heat distribution.

For example, it is suggested that the thermal conductivity of the bonding material is defined to decrease a maximum temperature difference between an inner segment and an outer segment, but it is difficult to decrease a temperature difference between the center of the outer segment and the vicinity of an outer periphery coating material (e.g., Patent Document 2). Therefore, there remains unsolved a problem that the temperature in the vicinity of the coating material of the outer segment does not easily rise and that the soot of the corresponding portion is not easily completely burnt.

In particular, there remains unsolved a problem that the temperature in the vicinity of the outer periphery coating material of the outer segment does not easily rise in the honeycomb segment having a high porosity (a low thermal conductivity) as compared with the honeycomb segment having a high thermal conductivity.

On the other hand, it is suggested that the ratio of the thermal conductivity of the coating material with respect to the thermal conductivity of the bonding material is defined as 0.1 to 0.8 to decrease the maximum temperature difference between the inner segment and the outer segment and to improve the insulation property of the honeycomb structure. However, the porosity of the coating material is increased to decrease the thermal conductivity of the coating material, so that a problem that the strength of the coating material lowers and that the coating material is cracked remains unsolved (e.g., Patent Document 3).

Patent Document 1: JP-A-2000-7455
Patent Document 2: JP-A-2001-162119
Patent Document 3: JP-A-2002-273137

DISCLOSURE OF THE INVENTION

The present invention has been developed in view of the problem of such a conventional technology. That is, an object (a theme) of the present invention is to decrease a temperature difference between the center of an outer segment having a high porosity (a segment having a low thermal conductivity) and the vicinity of a coating material, whereby the burning of soot deposited in the vicinity of the outer periphery coating material of the outer segment is promoted to improve a regeneration efficiency, and the generation of crack in a honeycomb structure is prevented.

That is, according to the present invention, the following honeycomb structure is provided.

[1] A honeycomb structure which is made of a ceramic and in which a plurality of honeycomb segments having cell structures and porous outer walls on outer peripheries of the cell structures are integrated by bonding these outer walls to one another with a bonding material, each of the cell structures being provided with a plurality of cells constituting fluid channels divided by porous partition walls, wherein an outer periphery coating material constituting the outer peripheral wall of the honeycomb structure has a porosity of 10 to 60%.

[2] The honeycomb structure according to the above [1], wherein the outer periphery coating material constituting the outer peripheral wall of the honeycomb structure has a thermal conductivity of 0.01 to 0.5 W/mK.

[3] The honeycomb structure according to the above [1] or [2], wherein the outer periphery coating material constituting the outer peripheral wall of the honeycomb structure has a thickness of 0.01 to 1 mm.

[4] The honeycomb structure according to any one of the above [1] to [3], wherein the outer periphery coating material contains one selected from the group consisting of oxide particles, an oxide fiber, a colloidal oxide, plate-like particles, an organic binder, an inorganic binder and an organic or inorganic hollow balloon-like filler.

[5] The honeycomb structure according to the above [4], wherein the outer periphery coating material contains the oxide particles of silica, alumina, zirconia, aluminum titanate, mullite or cordierite.

[6] The honeycomb structure according to the above [4] or [5], wherein the oxide particles have a particle diameter of 0.1 to 30 μm.

[7] The honeycomb structure according to any one of the above [4] to [6], wherein the outer periphery coating material contains the organic and/or inorganic hollow balloon-like filler.

[8] The honeycomb structure according to any one of the above [1] to [7], wherein the thermal conductivity of a base material constituting the honeycomb structure is in a range of 0.1 to 20 W/mK.

According to the honeycomb structure of the present invention, when the generation of crack in the honeycomb structure is suppressed, a soot regeneration efficiency can be increased.

DESCRIPTION OF REFERENCE NUMERALS

1: honeycomb structure, 2: partition wall, 3: cell, 5: cell structure, 7: outer wall, 8: bonding material, 12: honeycomb segment, 36: bonded body, 42: diamond tool, 43: coating material, 44: smoothing plate, 45: shaft, 46: handle, 47: pressing jig, 48: outer periphery coater, 50: outer peripheral wall.

BEST MODE FOR CARRYING OUT THE INVENTION

An embodiment of the present invention will hereinafter be described, but it should be understood that the present invention is not limited to the following embodiment, and the scope of the present invention includes the present invention appropriately subjected to design change, improvement and the like based on the ordinary knowledge of any one skilled in the art within the scope of the present invention.

Figure 1A:
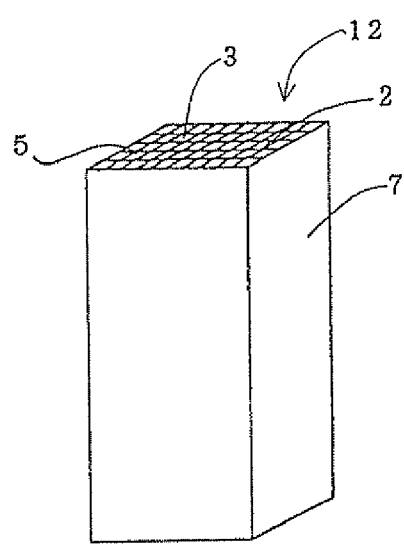
FIG. 1(a) is a diagram showing one embodiment of a honeycomb structure according to the present invention, and is a perspective view showing a honeycomb segment.
Figure 1B:
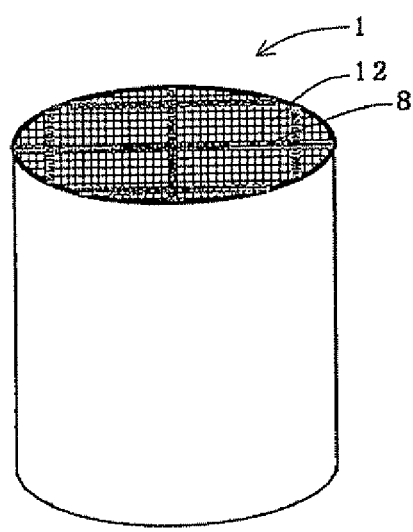
FIG. 1(b) is a diagram showing the embodiment of the honeycomb structure according to the present invention, and is a perspective view showing the honeycomb structure.
Figure 1C:
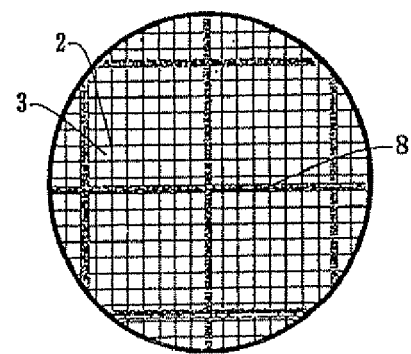
FIG. 1(c) is a diagram showing the embodiment of the honeycomb structure according to the present invention, and is a top plan view showing the honeycomb structure.

FIG. 1 shows one embodiment of a honeycomb structure according to the present invention. FIG. 1(a) is a perspective view showing a honeycomb segment. FIG. 1(b) is a perspective view showing the honeycomb structure. FIG. 1(c) is a top plan view showing the honeycomb structure. In a honeycomb structure 1 according to the present embodiment, a plurality of honeycomb segments 12 having cell structures 5 and porous outer walls 7 on outer peripheries of the cell structures 5 are integrated by bonding these outer walls 7 to one another with a bonding material 8, each of the cell structures being provided with a plurality of cells 3 constituting fluid channels divided by porous partition walls 2.

In general, it is understood that a thermal conductivity is a coefficient indicating ease of occurrence of heat movement caused by a temperature difference in a substance. The thermal conductivity is indicated in a quantity of heat which moves as much as a unit area in a unit time, when there is a temperature difference of 1° C. per unit length (thickness). That is, when a temperature difference between a surface A (TA) and a surface B (TB) in a cube having a volume of 1 m$^3$, the quantity of the heat which moves (A→B) as much as 1 m in one second is the thermal conductivity. The unit of the thermal conductivity is usually W/K. As the value of the thermal conductivity is large, the quantity of the heat which moves increases, and the heat is easily conducted.

In the present invention, the thermal conductivity of a base material is the thermal conductivity of the honeycomb segment of the honeycomb structure, and is measured by, for example, a laser flash process.

The laser flash process is a process in which laser light is emitted from a laser oscillator, and directly struck on the surface of a sample to measure the quantity of the heat emitted from the back surface of the sample and time, whereby specific heat (Cp) and thermal diffusion (α) are derived to calculate the thermal conductivity (λ) by "the thermal conductivity λ=α·Cp·ρ". For example, a disc-like sample having a diameter of 8 to 10 mm and a thickness of 0.5 to 3 mm is irradiated with the laser light, and a temperature history curve in the back surface is analyzed to obtain the thermal conductivity. The laser flash process is suitable for measurement of a substance such as a metal or a ceramic having a satisfactory thermal conductivity. Other examples of the method for measuring the thermal conductivity include a heat line process, a flat plate heat flow meter process, and a temperature gradient process.

The thermal conductivity of the base material according to the present invention is preferably 0.1 to 20 W/mK, further preferably 0.1 to 15 W/mK, especially preferably 0.1 to 10 W/mK. The honeycomb segment having the base material thermal conductivity in such a range is used, whereby an effect that a soot regeneration efficiency improves is produced.

An outer periphery coating material is a bonding material which coats the outer periphery of the honeycomb segment in a step of bonding the honeycomb segments to one another to manufacture the honeycomb structure. The bonding material includes ceramic powder, an inorganic binder, a ceramic fiber and an organic binder.

Examples of the ceramic powder for use in the present invention include a ceramic selected from the group consisting of silicon carbide (SiC), silicon nitride (SiNx), cordierite, silica, alumina, mullite, zirconia, zirconium phosphate, aluminum titanate, titania and a combination of them, an Fe—Cr—Al-based metal, a nickel-based metal, and a metal silicon (Si)-silicon carbide (SiC) composite material. In the present invention, silicon, silica, alumina, zirconia, aluminum titanate, mullite and cordierite are especially preferable.

Examples of the inorganic binder for use in the present invention include silica sol, alumina sol, colloidal silica and colloidal alumina. These materials may be used alone or as a combination of two or more types of them.

Examples of the ceramic fiber for use in the present invention include oxide fibers of mullite, aluminosilicate, alumina, magnesium silicate and magnesium calcium silicate.

The outer periphery coating material of the present invention preferably contains oxide particles, an oxide fiber, a colloidal oxide, plate-like particles, an organic binder, or an organic or inorganic hollow balloon-like filler.

The outer periphery coating material has a porosity of preferably 10 to 60%, further preferably 20 to 55%. The outer periphery coating material having the porosity in such a range is used, thereby producing an effect that the generation of crack in the honeycomb structure is suppressed and that the soot regeneration efficiency is improved.

The outer periphery coating material preferably has a thermal conductivity of 0.01 to 0.5 W/mK. The outer periphery coating material in such a range is used, thereby producing the effect that the generation of the crack in the honeycomb structure is suppressed and that the soot regeneration efficiency is improved.

The oxide particles have a particle diameter of preferably 0.1 to 30 μm, further preferably 1 to 30 μm and especially preferably 1 to 27 μm. The coating material containing the oxide particles having the particle diameter in this range is used, thereby producing the effect that the generation of the crack in the honeycomb structure is suppressed and that the soot regeneration efficiency is improved.

In the present invention, the particle diameter of the oxide particles is the average particle diameter of the oxide particles. The average particle diameter is the peak value of a particle size distribution curve measured by a particle size distribution measurement device. Examples of a method for measuring the average particle diameter of the oxide particles include a light scattering process based on a difference of Brownian motion caused by a difference of particle size, a laser diffraction scattering process for measuring the particle size distribution by use of semiconductor laser, scattering principle and Fraunhofer diffraction principle, a powder specific surface area measurement process, a gravity sedimentation process and a central separation process.

The outer periphery coating material preferably has a thickness of 0.01 to 1 mm. The outer periphery coating material having such a thickness is used, thereby producing the effect that the generation of the crack in the honeycomb structure is suppressed and that the soot regeneration efficiency is improved.

Examples of the organic and/or inorganic hollow balloon-like filler are as follows. Examples of the organic hollow balloon-like filler include acrylic hollow particles, foam particles, a foam resin and a sponge-like foam body. Examples of the inorganic hollow balloon-like filler include hollow metal oxide fine particles such as hollow titanium oxide particles and hollow iron oxide particles.

The honeycomb structure of the present invention is manufactured by bonding, with a bonding material, the honeycomb segments having a base material thermal conductivity of 0.1 to 20 W/mK. Examples of raw materials for manufacturing the honeycomb segments include a ceramic selected from the group consisting of silicon carbide (SiC), silicon nitride (SiNx), cordierite, silica, alumina, mullite, zirconia, zirconium phosphate, aluminum titanate, titania and a combination of them, an Fe—Cr—Al-based metal, a nickel-based metal, and a metal silicon (Si)-silicon carbide (SiC) composite material. In the present invention, silicon carbide, silicon nitride, the metal silicon-silicon carbide composite material, aluminum titanate or cordierite is especially preferable. Further in the present invention, a binder such as methyl cellulose or hydroxypropoxyl methyl cellulose, a surfactant, water and the like are added to the raw material, and this material is kneaded to form a plastic clay. Subsequently, the resultant clay is extruded and formed in a forming step, to form a formed honeycomb body having a plurality of cells constituting fluid channels divided by partition walls. During the extrusion forming, a plunger type extruder, a biaxial screw type continuous extruder or the like may be used. When the biaxial screw type continuous extruder is used, a clay-forming step and a forming step can continuously be performed. The resultant formed honeycomb body can be dried by, for example, microwaves, dielectric heating and/or hot air, and then fired to obtain a fired honeycomb body.

The resultant fired honeycomb body is processed into a honeycomb segment having a predetermined shape. The body is processed by use of means such as a band saw or a metal saw, whereby the square-pole-like honeycomb segment having a bonding surface can be obtained. These honeycomb segments can be bonded to one another with a bonding material to obtain a honeycomb structure. There is not any special restriction on a method for coating the honeycomb segment with the bonding material, and, for example, a spray process, a coating process using a brush, a stylus or the like, a dipping process or the like may be employed.

To "dry" the coating material and the bonding material as mentioned in the present invention is to evaporate and solidify liquid components at such a temperature that components contained in the coating material and bonding material do not melt, that is, the components are substantially not fired. That is, in the honeycomb structure of the present embodiment, the coating material and bonding material are not fired, and are only dried, whereby bonding layers are formed to bond the outer walls of the honeycomb segments to one another. This does not easily cause bonding defects that the bonding layers are cracked or the bonding layers themselves peel owing to a difference of thermal expansion ratio or contraction ratio between the bonding layers and the honeycomb segments.

Moreover, in the honeycomb structure of the present embodiment, the coating material and bonding material are not fired, and are only dried, whereby the bonding layers are formed to bond the outer walls of the honeycomb segments to one another. Therefore, in particular, when the honeycomb structure has a large size, an effect that the bonding defects are not easily generated is remarkably exerted.

Figure 2A:
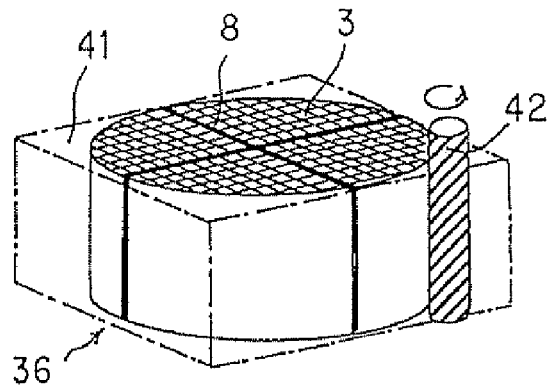
FIG. 2(a) is an explanatory view schematically showing one embodiment of a method for manufacturing the honeycomb structure according to the present invention.

It is to be noted that at least a part of the outer periphery of the honeycomb structure (a bonded body) formed by bonding the honeycomb segments to one another may be removed, if necessary. Specifically, as shown in FIG. 2(a), for example, preferably two or more cells 3, further preferably two to four cells 3 are removed from the outermost periphery. Here, to remove the cells is to remove at least a part of the partition walls forming the cells to obtain a state in which four peripheries are completely not surrounded with the partition walls. During the removal, for example, the outer periphery of a bonded body 36 can be ground using grinding means such as a diamond tool 42 to remove a removal portion 41 including a plurality of cells 3.

Figure 2B:
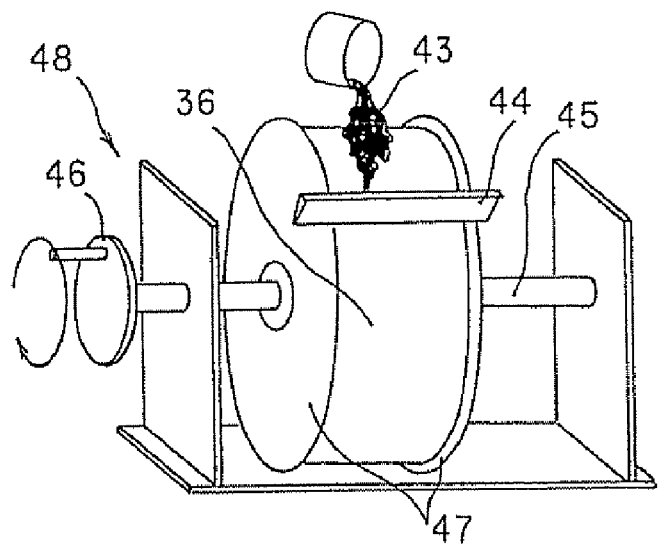
FIG. 2(b) is an explanatory view schematically showing the embodiment of the method for manufacturing the honeycomb structure according to the present invention.
Figure 2C:
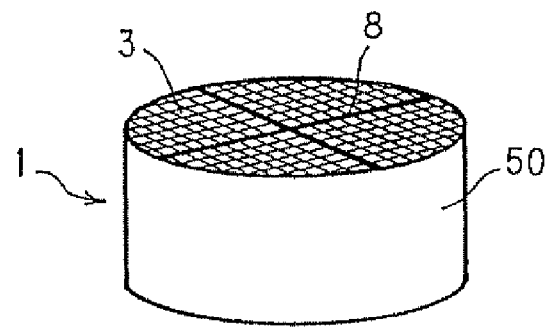
FIG. 2(c) is an explanatory view schematically showing the embodiment of the method for manufacturing the honeycomb structure according to the present invention.

When at least a part of the outer periphery of the bonded body 36 is removed, as shown in FIGS. 2(b) and 2(c), the corresponding portion is coated with a coating material 43 to form an outer peripheral wall 50 of the honeycomb structure 1. The coating material 43 preferably contains at least one selected from the group consisting of colloidal silica, colloidal alumina, a ceramic fiber, ceramic particles, an organic binder, an inorganic binder and hollow particles. Examples of the ceramic particles include the particles of silica, alumina and zirconia.

To apply the coating material, an outer periphery coater 48 shown in FIG. 2(b) is used, whereby the outer peripheral wall having a uniform wall thickness can be formed. Specifically, both end faces of the bonded body 36 having a part of the outer periphery removed are masked with pressing jigs 47 made of nylon, vinyl chloride or the like, and the bonded body 36 is held and fixed around a shaft 45 whose one end is provided with a rotating handle 46. Subsequently, the handle 46 is rotated, and the outer periphery of the bonded body 36 can uniformly be coated with the coating material 43 by use of a smoothing plate 44. It is to be noted that the thickness of the formed outer peripheral wall can be set by appropriately adjusting the size of the pressing jigs 47 with respect to the size of the bonded body 36.

Moreover, the coating material and bonding material of the present invention are not fired, and are only dried, whereby the bonding layers can be formed to bond bodies to be bonded to one another. Therefore, in particular, when the bodies to be bonded have a large size (an area to be coated with the bonding material is large), the effect that the bonding defects are not easily generated is remarkably exerted.

EXAMPLES

The present invention will hereinafter be described in accordance with examples in more detail, but the present invention is not limited to these examples.

1. Manufacturing of Honeycomb Segment and Measurement of Thermal Conductivity

SiC raw material powder and metal silicon powder were mixed at a mass ratio shown in Table 1, and starch and a foam resin as pore formers, further methyl cellulose, hydroxypropoxyl methyl cellulose, a surfactant and water were added to the material to prepare a plastic clay. This clay was extruded, formed, and dried by microwaves and hot air to obtain a honeycomb segment including partition walls having a thickness of 310 μm, having a cell density of about 46.5 cells/cm$^2$ (300 cells/square inch), having a square section with each 35 mm long side and having a length of 152 mm. In this honeycomb segment, the ends of the adjacent cells on opposite sides were plugged by use of a material similar to that used in manufacturing a honeycomb segment 2 so that the end faces of the segment have a checkered pattern. Afterward, the segment was dried, then degreased in the atmosphere at about 400° C. and then fired in an Ar inactive atmosphere at about 1450° C. to obtain Si—SiC honeycomb segments. The thermal conductivities of the respective honeycomb segments were measured by a laser flash process, and the results are shown in Table 1.

TABLE 1

| Base material No. | Amount of SiC powder to be blended % | Amount of metal Si powder to be blended % | Thermal conductivity W(mK)$^{-1}$ |
| --- | --- | --- | --- |
| 1 | 80 | 20 | 19 |
| 2 | 90 | 10 | 15 |
| 3 | 93 | 7 | 9 |
| 4 | 97 | 3 | 3 |
| 5 | 65 | 35 | 25 |

2. Preparation of Coating Material

To obtain coating materials A to F of the present invention, 35 mass % of oxide particles of alumina, silica or zirconia, 22 mass % of an aluminosilicate fiber as an oxide fiber, 40 mass % of silica sol as an inorganic binder, 19.5 mass % of an aqueous solution, 1 mass % of clay and 0.1 mass % of methyl cellulose as an organic binder were mixed. Afterward, water was added to the mixture, and the mixture was kneaded using a mixer for 30 minutes to obtain the coating materials. The compositions of the coating materials are shown in Table 2. Moreover, Table 2 similarly shows the compositions of coating materials G to J as comparative examples.

TABLE 2

| Coating material No. | Oxide particles | Oxide particle average particle diameter μm | Foam resin % | Thermal conductivity W(mK)$^{-1}$ |
| --- | --- | --- | --- | --- |
| A | Silica | 1 | 3 | 0.2 |
| B | Alumina | 1 | 3 | 0.2 |
| C | Zirconia | 1 | 3 | 0.2 |
| D | Silica | 1 | 0 | 0.4 |
| E | Silica | 1 | 5 | 0.1 |
| F | Silica | 25 | 3 | 0.3 |
| G | Silica | 35 | 3 | 0.6 |
| H | Silica | 1 | 8 | 0.03 |
| I | Silicon carbide | 1 | 3 | 0.8 |
| J | Silicon carbide | 1 | 8 | 0.4 |

3. Coating and Drying, Manufacturing of Honeycomb Structure

The outer periphery of a bonded body obtained by bonding 16 fired honeycomb segments shown in Table 1 was ground, and the corresponding outer peripheral portion was individually coated with each of the coating materials A to F of the present invention and the coating materials G to J of the comparative examples shown in Table 2. Afterward, the bonded body was dried at 200° C. for two hours to obtain a honeycomb structure.

4. Soot Test Method

The honeycomb structures having combinations shown in Tables 3, 4 and 5 were attached to the exhaust tube of a diesel engine, and 5 g/L of soot was accumulated in each honeycomb structure. Afterward, soot regeneration was performed at an exhaust gas flow rate of 2 m³/min. Each regenerated honeycomb structure was subjected to a thermal treatment in an electric furnace at 700° C. for ten hours, and a difference between a weight before the treatment and a weight after the treatment was obtained as a residual amount of soot.

5. Strength Measurement, Porosity Measurement, and Crack Generation Observation

Ten samples for the predetermined strength test were cut from each coating material, and were subjected to the measurement of a three-point bending strength according to JIS R1601. Furthermore, the porosity of each coating material was obtained by Archimedes' method. The presence of crack generated in the surface of the outer periphery coating material was observed. The results are shown in Tables 4 and 6.

6. Evaluation of Soot Test

As shown in Table 3, when the thermal conductivity of the base material was 20 W/mK or less and the thermal conductivity of the coating material was above 0.5 W/mK, the residual amount of soot increased, and a soot regeneration efficiency was deteriorated.

TABLE 3

|  | Base material No. | Coating material No. | Thermal conductivity of base material W(mK)$^{-1}$ | Thermal conductivity of coating material W(mK)$^{-1}$ | Residual amount of soot gL$^{-1}$ |
|---|---|---|---|---|---|
| Example 1 | 4 | A | 3 | 0.2 | 0.1 |
| Example 2 | 1 | A | 19 | 0.2 | 0 |
| Example 3 | 5 | A | 25 | 0.2 | 0 |
| Example 4 | 3 | D | 9 | 0.4 | 0.2 |
| Comparative Example 1 | 4 | I | 3 | 0.8 | 2 |
| Comparative Example 2 | 1 | I | 19 | 0.8 | 0.6 |
| Comparative Example 3 | 5 | I | 25 | 0.8 | 0.1 |
| Comparative Example 4 | 3 | G | 9 | 0.6 | 0.7 |

Moreover, as seen from the results of Examples 5 to 7 in Table 4, oxide particles having a low thermal conductivity are used, whereby the thermal conductivity of the coating material can be decreased, and the residual amount of soot can be prevented from being increased. When the particles of silicon carbide having a high thermal conductivity are used as in Comparative Examples 5 and 6, it is difficult to set the thermal conductivity of the coating material to a range of 0.01 to 0.5 W/mK or to inhibit the crack generation. Moreover, the soot regeneration efficiency lowers, and crack is generated.

TABLE 4

|  | Base material No. | Coating material No. | Thermal conductivity of coating material W(mK)$^{-1}$ | Residual amount of soot gL$^{-1}$ | Porosity % | Presence of crack | Coating material strength MPa |
|---|---|---|---|---|---|---|---|
| Example 5 | 3 | A | 0.2 | 0 | 41 | No crack | 2.1 |
| Example 6 | 3 | B | 0.2 | 0 | 43 | No crack | 2.2 |
| Example 7 | 3 | C | 0.2 | 0 | 42 | No crack | 2.1 |
| Comparative Example 5 | 3 | I | 0.8 | 1.6 | 42 | No crack | 2.3 |
| Comparative Example 6 | 3 | J | 0.4 | 0.1 | 66 | Cracked | 0.3 |

Furthermore, as shown in Examples 8, 9 and Comparative Example 7 in Table 5, when the average particle diameter of the oxide particles deviates from a range of 0.1 to 30 μm, the thermal conductivity of the coating material increases, and the soot regeneration efficiency becomes poor.

TABLE 5

| | Base material No. | Coating material No. | Oxide particles average particle diameter μm | Thermal conductivity of base material W(mK)$^{-1}$ | Thermal conductivity of coating material W(mK)$^{-1}$ | Residual amount of soot gL$^{-1}$ |
|---|---|---|---|---|---|---|
| Example 8 | 2 | A | 1 | 19 | 0.2 | 0 |
| Example 9 | 2 | F | 25 | 19 | 0.3 | 0 |
| Comparative Example 7 | 2 | G | 35 | 19 | 0.6 | 0.4 |

7. Crack Evaluation

As shown in Table 6, the porosity is increased, whereby the thermal conductivity of the coating material is effectively decreased. When the porosity of the coating material is in a range of 10 to 60%, especially 20 to 55%, any crack is not generated. On the other hand, when the porosity is 65%, the strength lowers, and the crack is generated.

TABLE 6

| | Coating material No. | Oxide particles | Oxide particles average particle diameter μm | Foam resin % | Porosity % | Thermal conductivity of coating material W(mK)$^{-1}$ | Coating material strength MPa | Presence of crack |
|---|---|---|---|---|---|---|---|---|
| Example 10 | A | Silica | 1 | 3 | 41 | 0.2 | 2.1 | No crack |
| Example 11 | B | Alumina | 1 | 3 | 43 | 0.2 | 2.2 | No crack |
| Example 12 | C | Zirconia | 1 | 3 | 42 | 0.2 | 2.1 | No crack |
| Example 13 | D | Silica | 1 | 0 | 20 | 0.3 | 5.3 | No crack |
| Example 14 | E | Silica | 1 | 6 | 55 | 0.1 | 1.2 | No crack |
| Comparative Example 8 | H | Silica | 1 | 10 | 65 | 0.03 | 0.2 | Cracked |

As described above, in the honeycomb structure of the present invention, when the base material has a thermal conductivity of 20 W/mK or less, the thermal conductivity of the coating material is decreased, and an insulation effect is improved, whereby the increase of the efficiency during the soot regeneration is achieved. The porosity of the coating material is defined to provide the coating material having a low thermal conductivity and a high strength, and both the inhibition of the crack generation and the increase of the soot regeneration efficiency are achieved.

INDUSTRIAL APPLICABILITY

A honeycomb structure according to the present invention is useful as a trap filter for an exhaust gas, for example, a diesel particulate filter (DPF) for trapping and removing a particulate matter (particulates) included in an exhaust gas from a diesel engine or the like.

The invention claimed is:

1. A honeycomb structure which is made of a ceramic and in which a plurality of honeycomb segments having cell structures and porous outer walls on outer peripheries of the cell structures are integrated by bonding these outer walls to one another with a bonding material,
each of the cell structures being provided with a plurality of cells constituting fluid channels divided by porous partition walls,
wherein an outer periphery coating material constituting the outer peripheral wall of the honeycomb structure has a porosity of 41 to 55% and a thermal conductivity of 0.01 to 0.5 W/mK.

2. The honeycomb structure according to claim 1, wherein the outer periphery coating material constituting the outer peripheral wall of the honeycomb structure has a thickness of 0.01 to 1 mm.

3. The honeycomb structure according to claim 1, wherein the outer periphery coating material contains one selected from the group consisting of oxide particles, an oxide fiber, a colloidal oxide, an organic binder, and an organic or inorganic hollow balloon-like filler.

4. The honeycomb structure according to claim 3, wherein the outer periphery coating material contains the oxide particles of silica, alumina, zirconia, aluminum titanate, mullite or cordierite.

5. The honeycomb structure according to claim 3, wherein the oxide particles have an average particle diameter of 0.1 to 30 mm.

6. The honeycomb structure according to claim 3, wherein the outer periphery coating material contains the organic and/or inorganic hollow balloon-like filler.

7. The honeycomb structure according to claim 1, wherein the thermal conductivity of a base material constituting the honeycomb structure is in a range of 0.1 to 20 W/mK.

* * * * *